A. L. PUTNAM.
METALLIC VEHICLE WHEEL.
APPLICATION FILED AUG. 26, 1916.

1,280,297.

Patented Oct. 1, 1918.

Inventor
Alden L. Putnam

By Whittemore Hulbert & Whittemore

Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

METALLIC VEHICLE-WHEEL.

1,280,297.          Specification of Letters Patent.          Patented Oct. 1, 1918.

Application filed August 26, 1916. Serial No. 116,996.

*To all whom it may concern:*

Be it known that I, ALDEN L. PUTNAM, a citizen of the United States of America, residing at Detroit, in the county of Wayne and State of Michigan, have invented certain new and useful Improvements in Metallic Vehicle-Wheels, of which the following is a specification, reference being had therein to the accompanying drawings.

The invention relates to metallic vehicle wheels of that type designed for use with demountable rims, and it is the primary object of the invention to provide a replacement member for wheels having broken spokes. To this end the invention comprises a construction of wheel body which is engageable with a standard construction of wheel hub, and is also capable of receiving the standard construction of demountable rim. The invention further comprises various features of construction as hereinafter set forth.

Figure 2:
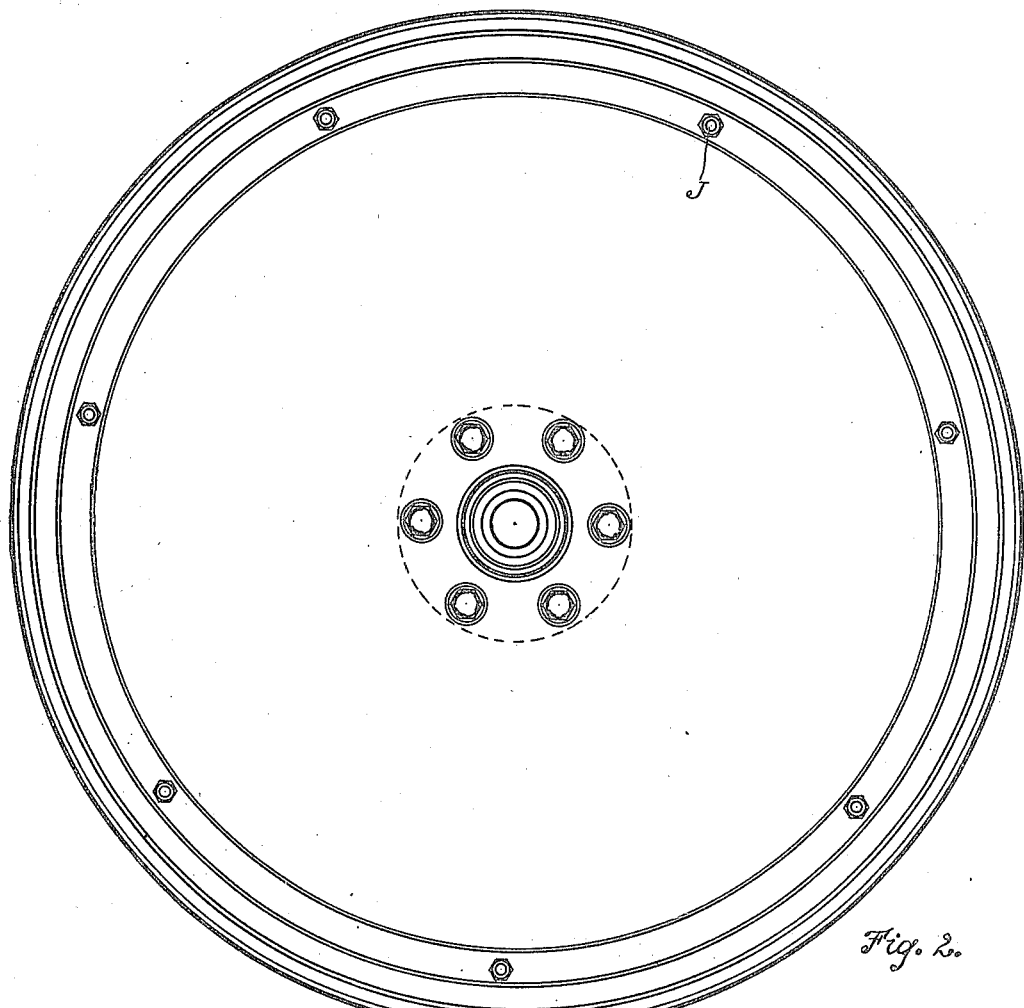
Fig. 2 is a side elevation.
Figure 1:
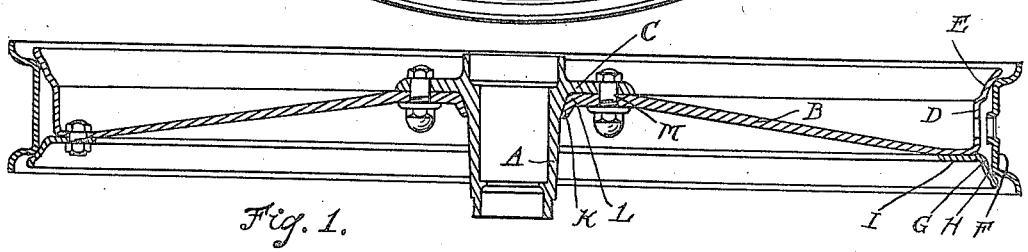
Figure 1 is a section through the wheel.

A is the hub, which may be of standard construction, and B is a metallic disk which is secured to the outwardly-extending flange C of the hub and is dished or slightly coned from center to periphery. This disk is further provided at the periphery with an annular rim flange D, preferably formed integral therewith, and the end portion of this flange is flared outward at E to form a seat for one edge of the demountable rim F. G is an annular member which has a complementary seat portion H for the opposite edge of the demountable rim and an inwardly-extending flange portion I for securing to the disk B, preferably by a series of bolts J.

To obtain the necessary strength, combined with the least weight the disk B is formed of metal of a tapering gage, the central portion which is clamped to the hub flange C being of greatest thickness and from this point to the periphery being gradually tapered to a lighter gage. The central portion of the disk is also preferably provided with an out-turned flange K of tapering form fitting a correspondingly tapered bearing L upon the hub. This relieves the clamping bolts M from shearing stress due to the load upon the wheel, and at the same time the construction is one which permits of readily detaching the disk from the hub should it be desired to demount the entire wheel instead of the rim only.

As has been stated, the construction is particularly applicable as a replacement for broken spoked wheels. When such a replacement is made, the clamping flange of the hub is detached and the spokes removed; the disk B is then sleeved upon the body of the hub and the apertures N therein are registered with the corresponding apertures in the hub flange, and bolts are inserted and tightened. The demountable rim may then be placed upon the rim of the body in the manner already described.

What I claim as my invention is:—

1. In a vehicle wheel, the combination with a hub of a dished metallic disk centrally secured to said hub at one side of the plane of impact of the wheel and provided at the other side of said plane with a peripheral flange flared to form a seat for one side of the demountable rim, and a complementary flared flange detachably secured to said disk and forming the seat for the opposite side of the demountable rim.

2. In a vehicle wheel, the combination with a hub having a radially-extending annular flange, of a dished metallic disk sleeved upon said hub and detachably bolted to said flange at one side of the plane of impact of the wheel, a flange at the periphery of said disk extending laterally therefrom and flared to form a seat for one edge of a demountable rim, and a complementary flared flange detachably bolted to said disk at the other side of the plane of impact of the wheel, forming the seat for the opposite edge of said demountable rim.

3. In a vehicle wheel, the combination with the hub having a radially-extending annular flange, of a dished metallic disk sleeved upon said hub at one side of the plane of impact of the wheel and provided with an outwardly-turned flange forming a bearing on the hub, means for detachably securing said disk to said radially-extending flange, a flange at the periphery of said disk extending laterally therefrom and flared to form a seat for a demountable rim, and a complementary flared flange at the other side of the plane of impact detachably clamped to said disk and forming a seat for the opposite edge of said demountable rim.

In testimony whereof I affix my signature.

ALDEN L. PUTNAM.